United States Patent [19]
Jenkins

[11] Patent Number: 4,848,926
[45] Date of Patent: Jul. 18, 1989

[54] FLUID TEMPERATURE AND FLOW MONITOR

[75] Inventor: Maurice A. Jenkins, Casselberry, Fla.

[73] Assignee: Westinghouse Electric Corp., Pittsburgh, Pa.

[21] Appl. No.: 147,328

[22] Filed: Jan. 22, 1988

[51] Int. Cl.[4] .................... G01F 1/28; G01K 13/02
[52] U.S. Cl. .................... 374/142; 73/861.74; 374/163
[58] Field of Search ............... 374/142, 152, 148, 163; 73/204, 861.74

[56] References Cited

U.S. PATENT DOCUMENTS

| | | | |
|---|---|---|---|
| 2,805,574 | 9/1952 | Jackson | 73/228 |
| 2,943,486 | 2/1957 | Osgood | 73/198 X |
| 3,081,628 | 3/1963 | Salera | 73/204 |
| 3,354,714 | 11/1967 | Condon | 73/186 |
| 3,354,716 | 11/1967 | Wiebe et al. | 73/198 |
| 3,380,299 | 4/1968 | Seymour | 73/186 |
| 3,493,949 | 2/1970 | Servos et al. | 374/111 |
| 3,559,486 | 2/1971 | Gormar | 374/148 |
| 4,036,058 | 7/1977 | Bodker | 374/152 |
| 4,599,907 | 7/1986 | Kraus et al. | 73/861.74 |
| 4,622,202 | 11/1986 | Yamada et al. | 374/142 X |
| 4,630,940 | 12/1986 | Ostertag | 374/148 |

*Primary Examiner*—Daniel M. Yasich

[57] ABSTRACT

A combined fluid flow and temperature monitor composed of: a housing defining a fluid flow path having an inlet end and an outlet end, the housing having a support member; a flexible, elongated member having a first end secured to the support member and a second end located within the flow path, the elongated member having a portion adjacent the second end which is disposed in the flow path and which extends transverse to the direction of the fluid flow in the flow path, and the elongated member being positioned and oriented such that the second end experiences deflection relative to the first end in response to fluid flowing through the flow path and by an amount proportional to the rate of flow of fluid through the flow path; a deflection sensing device secured to the elongated member for producing an electrical signal indicative of the amount of deflection of the second end relative to the first end, the deflection sensing device having output conductors on which the electrical signal appears; a temperature sensing device mounted on the elongated member at a location which is exposed to fluid flowing through the flow path, the temperature sensing device having output conductors for providing an electrical signal indicative of the temperature of fluid flowing through the flow path; and a coupler extending through the housing in a fluid-tight manner for conducting the signals appearing on the conductors to a location outside the housing.

16 Claims, 1 Drawing Sheet

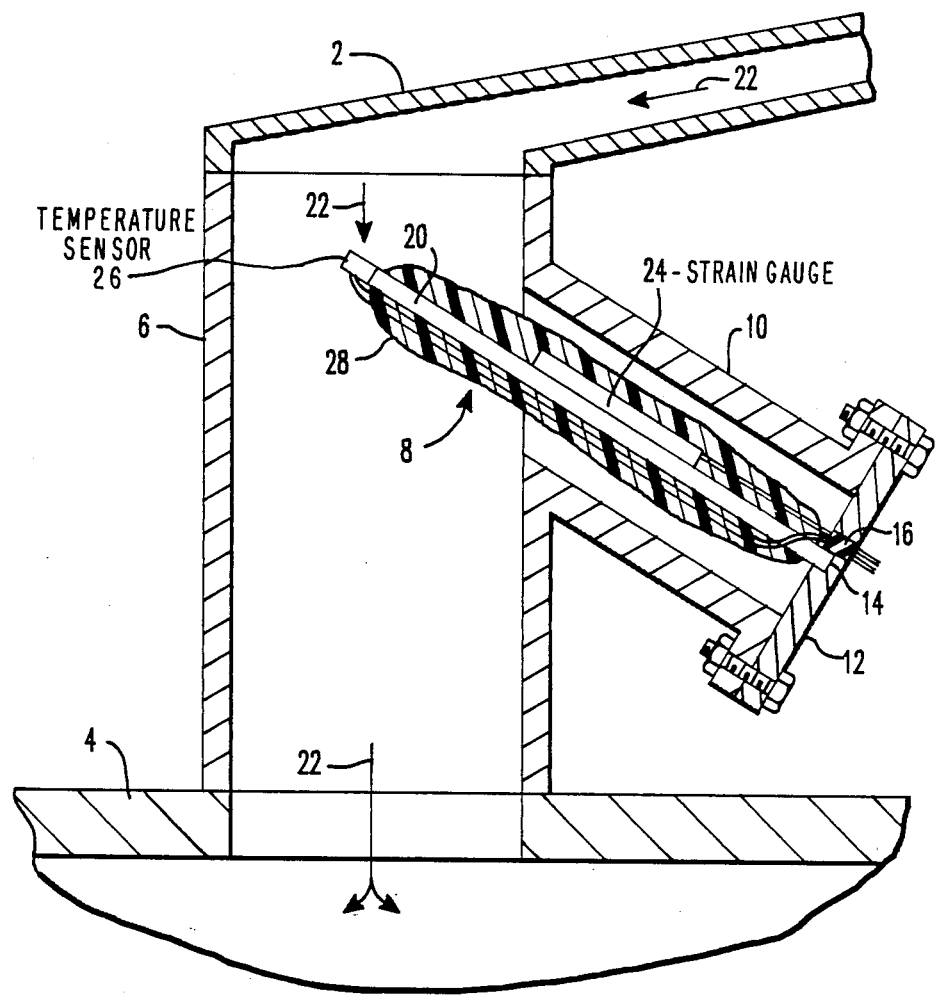

FLUID TEMPERATURE AND FLOW MONITOR

BACKGROUND OF THE INVENTION

The present invention relates to fluid monitors, particularly for monitoring fluid flowing through a flow path.

In many industrial systems, it is necessary or desirable to be able to monitor the temperature and/or rate of flow of fluid flowing along a flow path. For example, in the case of water cooled generator stators, it is necessary to monitor the temperature of the water being used to cool the stator coils.

It is known to monitor the temperature of the cooling water of generator stator coils by means of a thermocouple which is mounted on the outer surface of a nipple forming of the coolant water flow path. Since the region surrounding such a nipple generally contains hot hydrogen, which could adversely influence the thermocouple, it is the usual practice to seal the thermocouple off from the hot hydrogen atmosphere by a sealing arrangement composed of dacron felt and glass tape. However, it has been found that such seals are not completely effective and eventually permit hot hydrogen gas to contact the thermocouple and to then adversely influence its reading. There is no known way of compensating for such reading errors because the rate of deterioration of a given seal cannot be predicted.

In addition, current systems do not make any provision for simultaneously monitoring coolant water flow. Therefore, if an abnormally high temperature should be detected by the thermocouple, the operator cannot determine whether this is due to faulty generator operation or a blockage or leak in the coolant water flow path.

SUMMARY OF THE INVENTION

It is therefore an object of the present invention to provide a monitoring unit which avoids the above-described drawbacks of the prior art.

A more specific object of the invention is to provide a novel monitoring unit which assures reliable temperature detector operation.

Yet another specific object of the invention is to provide a novel monitoring unit which monitors both the temperature and the flow rate of a fluid.

A still further object of the invention is to provide a monitoring unit which is structurally simple and has a high degree of reliability.

The above and other objects are achieved, according to the present invention, by a combined fluid flow and temperature monitor comprising:

a housing defining a fluid flow path having an inlet end and an outlet end, the housing having a support member;

a flexible, elongated member having a first end secured to the support member and a second end located within the flow path, the elongated member having a portion adjacent the second end which is disposed in the flow path and which extends transverse to the direction of fluid flow in the flow path, and the elongated member being positioned and oriented such that the second end experiences deflection relative to the first end in response to fluid flowing through the flow path and by an amount proportional to the rate of flow of fluid through the flow path;

deflection sensing means secured to the elongated member for producing an electrical signal indicative of the amount of deflection of the second end relative to the first end, the deflection sensing means having output conductors on which the electrical signal appears;

temperature sensing means mounted on the elongated member at a location which is exposed to fluid flowing through the flow path, the temperature sensing means having output conductors for providing an electrical signal indicative of the temperature of fluid flowing through the flow path; and means extending through the housing in a fluid-tight manner for conducting the signals appearing on the conductors to a location outside the housing.

While the invention can be employed for monitoring any flowing fluid, i.e. liquid or gas, it has been developed initially for solving problems associated with the monitoring of generator stator coil cooling water flow

BRIEF DESCRIPTION OF THE DRAWING

The FIGURE is a cross-sectional view illustrating a preferred embodiment of a monitoring unit according to the present invention installed in a stator coil coolant flow channel.

DESCRIPTION OF THE PREFERRED EMBODIMENTS

The FIGURE illustrates a conduit 2 via which cooling water from a generator stator coil is delivered to an outlet manifold 4 having a flow passage via a nipple 6 inserted in the cooling water flow path to support the monitoring assembly 8 according to the invention.

Nipple 6 includes a side channel 10 closed at its outer end by a side cap 12 which is removably fixed to side channel 10 via suitable bolts, with an appropriate sealing element being interposed between side channel 10 and side cap 12.

Alternatively, channel 10 could be modified by replacing the end flange shown in the FIGURE by an external thread and side cap 12 could be modified to have an internally threaded rim extending adjacent side channel 10. Cap 12 could then be screwed onto channel 10. In this case, it would be desirable to provide some referencing arrangment on the outer surface of channel 10 and/or cap 12 to assure that assembly 8 is correctly oriented in the flow path.

The interior surface of side cap 12 is provided with a machined slot, or groove, 14. In addition, side cap 12 is provided with a through passage which is closed by a suitable plug 16 which provides a sealed passage for electrical conductors associated with assembly 8. Plug 16 is constructed in a known manner to maintain a fluid-tight, i.e. liquid- and gas-tight, seal between the interior of channel 10 and the region outside of side cap 12.

Monitoring assembly 8 is composed of a resilient, flexible strip 20, for example a reed, which is supported by side cap 12 in that one end of strip 20 is fitted into slot 14 and a weld is then formed between strip 20 and side cap 12. In cross section, strip 20 has a wide dimension perpendicular to the plane of the FIGURE and a narrow dimension parallel to the plane of the FIGURE.

An end portion of strip 20 remote from side cap 12 projects into the water flow path defined by nipple 6 so that water flowing along the path, in the direction of arrows 22, impacts against one wide side of strip 20.

On the wide side of strip 20 against which the water flow impacts, a strain gauge 24 is fastened. Strain gauge 24 is provided with output conductors which extend to the outside through plug 16.

At the end of strip 20 remote from side cap 12, there is mounted a temperature monitoring device 26 which may, for example, be a thermocouple or a resistance temperature detector. Device 26 is also provided with output conductors which extend to the outside through plug 16.

While the FIGURE illustrates an embodiment in which the output conductors associated with the monitoring devices extend to the outside through a sealing plug 16, it is alternatively anticipated that these conductors could be connected to terminals mounted on the interior surface of cap 12 and that cap 12 could be constructed, in a known manner, to provide connections for those terminals to corresponding plug-in terminals mounted on the exterior surface of cap 12. Any other known technique for conducting signals from the interior of side channel 10 to the outside could, of course, be employed.

If desired, a portion of strip 20, between its ends, as well as strain gauge 24 and the conductors associated with gauge 24 and device 26 may be encapsulated in a mass of suitable potting compound 28.

When cooling water flows along the illustrated flow path in the direction of arrows 22 from conduit 2, through nipple 6, and then through the flow passage provided in manifold 4, the temperature of the water is directly monitored by device 26. At the same time, the coolant water impacting on the free end of strip 20, or on the potting material 28 at the free end, deflects the free end in the direction toward outlet manifold 4, imposing a tensile stress on strain gauge 24. As a result, strain gauge 24 produces an output signal indicative of the degree of deflection of strip 20, and thus of the rate of flow of cooling water in nipple 6.

The material and dimensions of strip 20 will be appropriately selected, based on principles well known in the art, and taking into account the characteristics of strain gauge 24 and the influence of potting compound 20, to assure that the range of flow rate values to which the monitor is to respond will impose a suitable level of stress on gauge 24.

It is particularly preferred that the material of strip 20 have a low coefficient of thermal expansion and a high degree of resiliency.

Since temperature monitoring device 26 is disposed directly in the fluid flow path, it will provide an accurate temperature indication, while the mounting of the temperature monitoring device on the end of strip 20 results in the monitoring of temperature and flow rate at the same location along the flow path. Moreover, since the temperature monitoring device is located within nipple 6, it will be completely isolated from the atmosphere, and particularly the hot hydrogen, surrounding nipple 6.

Thus, the unit according to the present invention simultaneously provides information regarding temperature and flow rate, so that if an abnormal temperature reading should be produced, a direct determination will be provided of whether this abnormal reading is associated with a blockage of the water flow path.

Such a monitoring unit can be used to particular advantage in expert diagnostic systems since it provides a highly useful combination of readings and possesses a high degree of reliability. The reliability of a unit according to the invention is enhanced both by the simplicity of its structure and by its effective isolation from the surrounding environment.

While, in the illustrated embodiment, strip 20 is inclined to the flow direction, represented by arrows 22, this orientation is not critical. Strip 20 could be oriented to extend at right angles to the flow direction 22 or could be inclined to form a smaller angle than illustrated with the flow direction. The precise orientation will be determined primarily by the configuration of the nipple, or other structure, in which the monitoring unit is to be installed, and the various parameters, discussed above, determining the response of strain gauge 24 to fluid flow will then be adjusted on the basis of the selected orientation. Of course, for a given monitoring unit, the sensitivity to fluid flow will be a maximum if the strip 20 extends at right angles to flow direction 22.

It will be understood that the above description of the present invention is susceptible to various modifications, changes, and adaptations, and the same are intended to be comprehended within the meaning and range of equivalents of the appended claims.

What is claimed is:

1. A combined fluid flow and temperature sensor comprising:

a housing defining a fluid flow path having an inlet end and an outlet end, said housing having a support member connected to said housing at a point intermediate said ends;

a flexible, elongated member having a first end secured to said support member and a second end located within said flow path, said elongated member having a portion adjacent said second end which is disposed in said flow path and which extends transverse to the direction of fluid flow in said flow path, and said elongated member being positioned and oriented such that said second end experiences deflection relative to said first end in response to fluid flowing through said flow path and by an amount proportional to the rate of flow of fluid through said flow path;

deflection sensing means secured to said elongated member for producing an electrical signal indicative of the amount of deflection of said second end relative to said first end, said deflection sensing means having output conductors on which the electrical signal appears;

temperature sensing means mounted on said elongated member at a location near said second end which is exposed to fluid flowing through said flow path, said temperature sensing means having output conductors for providing an electrical signal indicative of the temperature of fluid flowing through said flow path; and means extending through said housing in a fluid-tight manner for conducting the signals appearing on said conductors to a monitoring location outside said housing.

2. A device as defined in claim 1 wherein said flexible, elongated member is in the form of a reed having a wide dimension extending transverse to the direction of fluid flow along said flow path.

3. A device as defined in claim 1 wherein said flexible, elongated member has a first surface directed toward said inlet end of said flow path, and said deflection sensing means comprise a strain gauge secured to said first surface of said elongated member.

4. A device as defined in claim 3 wherein said temperature sensing means comprise a thermocouple.

5. A device as defined in claim 3 wherein said temperature sensing means comprise a resistance temperature detector.

6. A device as defined in claim 3 wherein said temperature sensing means are mounted at said second end of said elongated member.

7. A device as defined in claim 6 wherein said temperature sensing means comprise a thermocouple.

8. A device as defined in claim 6 wherein said temperature sensing means comprise a resistance temperature detector.

9. A device as defined in claim 1 wherein said housing comprises means defining a side chamber extending laterally from, and communicating with, said fluid flow path, and said support member is in the form of a cap closing the end of said side chamber which is remote from said fluid flow path.

10. A device as defined in claim 9 wherein said cap has a surface delimiting said chamber and provided with a slot into which said first end of said elongated member is fitted.

11. A device as defined in claim 10 wherein said elongated member is welded, at said first end, to said cap.

12. A device as defined in claim 10 wherein said cap is further provided with a through passage, and said means extending through said housing comprise a plug member inserted into said through passage and sealing said through passage in a fluid-tight manner, and wherein said output conductors of said deflection sensing means and said temperature sensing means extend through said plug member while forming a fluid-tight seal therewith.

13. A device as defined in claim 1 further comprising a mass of potting compound supported by said elongated member and encapsulating said deflection sensing means.

14. A device as defined in claim 13 wherein said mass of potting compound further encapsulates at least a substantial portion of said output conductors of said deflection sensing means and said temperature sensing means and at least a substantial portion of said elongated member.

15. A device as defined in claim 1 wherein said support member is removable from said housing, together with said elongated member, said deflection sensing means and said temperature sensing means.

16. A device as defined in claim 1 wherein said housing is installed in a stator coil cooling water flow system of a generator.

* * * * *